Sept. 22, 1953

L. MAYERS 2,652,833

CARD INDEX FILE

Filed April 12, 1949

Lewis Mayers
INVENTOR.

Patented Sept. 22, 1953 2,652,833

UNITED STATES PATENT OFFICE 2,652,833

CARD INDEX FILE

Lewis Mayers, New York, N. Y.

Application April 12, 1949, Serial No. 87,102

2 Claims. (Cl. 129—16)

My improvement has reference to reference indexes, composed of a plurality of individual reference members positioned vertically in a container, each reference member having a line of identifying characters near its upper edge; and it is the purpose of my improvement to increase the visibility of such identifying line, thereby facilitating the finding of any desired reference member in the container, and the insertion or replacement of reference members therein.

The type of reference index described is most commonly employed in the form of a so-called card index file, and I shall describe my improvement as applied to such a file, although my improvement is in nowise limited thereto.

The common type of card index file, consisting of a number of cards placed one behind the other in a suitable tray or box, suffers from the defect that each card obscures the one behind it, so that before the index line of a given card can be read, it is necessary manually to bring forward the card or cards in front of it. To overcome this defect, numerous devices (commonly termed "visible index" devices) exist which, discarding the positioning of the cards one behind the other in complete congruity, as just described, substitute therefor a staggered positioning, the upper (or lower) margin of each card (or in some devices, a right or left hand margin) being thus exposed to view at all times. To accomplish this staggered positioning, however, a more or less cumbersome and expensive type of equipment is required; and the ease of insertion of new cards (as well as of the removal of a given card from the file for further entries, etc.) is impaired. In the present improvement, the conventional card file, with complete congruity of positioning of the several cards, is retained; but the portion of the upper margin of any given card containing its index legend is nevertheless exposed, when desired, without the necessity of manipulating individual cards.

This result is accomplished by employing, in lieu of the conventional card which has a plane surface, a card which has been cylindrically warped, along either its horizontal or vertical axis. When cards so warped are arranged in couplets, with their concave surfaces in apposition, the couplet forms an elastic member which has a much greater dimension in the center than at the edges. One being compressed by the cards in front of and/or behind it, the couplet assumes a planar form; but, on such compression being withdrawn, the couplet resumes its original convex-concave form, the enlargement at its center tending to separate its edges from those of the couplets in front of and behind it; thus exposing such edges to view, together with any indexing legend which may appear below the edge of the front card.

In the particular embodiment of my invention shown in the accompanying drawing.

Figure 1:
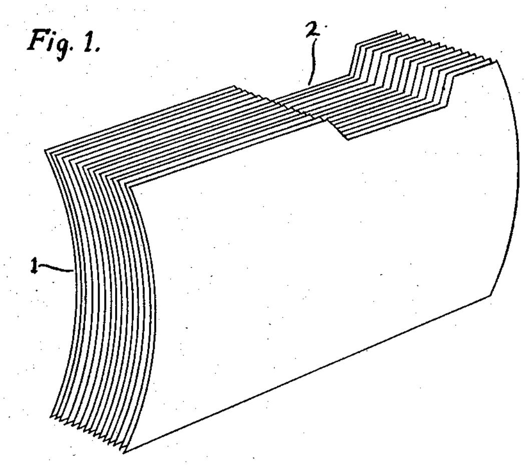
Fig. 1 is a perspective view of a pack of cards made according to my invention.

In Fig. 1, the cards are not under planar compression, each card thus having a cylindrical curvature 1, along its horizontal axis and, at the identical position along its upper edge, a suitable portion 2, cut out.

Figure 2:
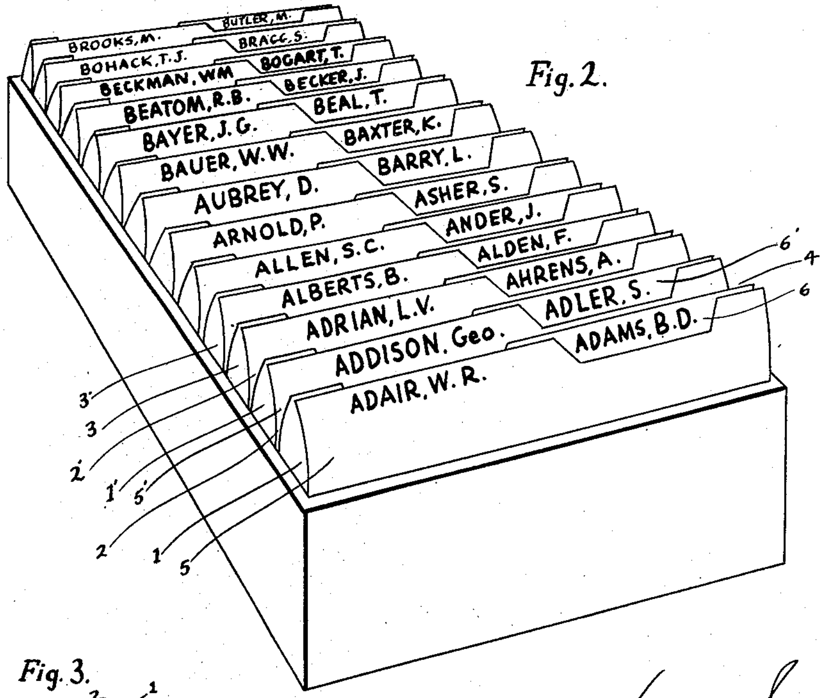
Fig. 2 is a perspective view of a file drawer containing a group of such cards with every other one being reversed.
Figure 3:
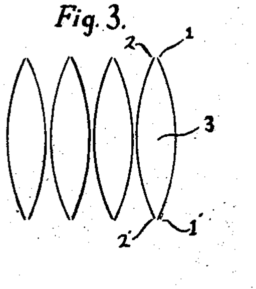
Fig. 3 is a view of the end edges of several of the cards shown in Fig. 2.

Fig. 2 is a perspective drawing showing the same cards arranged without compression in a file drawer or tray, every other card having been reversed, so that the curvature 1, 1′ of the first, third, fifth, etc. cards with respect to the front of the container is convex, while the curvature 2, 2′ of the second, fourth, sixth, etc. cards is concave, the first and second cards, the third and fourth cards, the fifth and sixth cards, etc., thus forming, in each case, a couplet, the two members of which are in close approximation at their upper and lower edges, but are separated from one another at their middle by the spaces 3, 3′ thus causing the edges of the first and second cards, in close approximation, to be separated by a space 4, from the edges of the third and fourth cards. This separation makes it possible to read not merely the index 5, of the first and the index 5′, of the third card, but also by reason of the cut-out on each of such cards, to read the index 6, on the second card and the index 6′, on the fourth card. In a similar manner, all of the indices of all of the cards are equally visible.

For simplicity, Fig. 2 shows the cards, without compression, occupying the whole of the container. In practice, a larger container would be used, so nearly filled with cards as to result in almost complete planar compression. Guide index cards with tabs, familiar to the art, are provided at suitable intervals—say for every twenty cards. In order to locate a particular card, the guide cards in front of and behind such card are pulled forward and pushed backward respectively, thus creating a space between the two guide cards. This releases the compression on the intervening cards, which thereupon assume the convex-concave shape shown in the drawing.

Although in the foregoing I have exhibited the cards as warped along the axis parallel to the top or bottom edge of the card, it is equally possible to warp them along the axis parallel to the side edges of the cards. In this application, cutouts may be omitted entirely, or placed to the left of the center of the upper edge of the cards bowed concavely.

Although I have in the foregoing described the application of my invention to the original manufacture of a set of cards, my invention is also applicable to an existing set of cards. So to apply it, the cards in the set are successively so bent, by processes well-known in the art, so as to give each one a cylindrical warp, alternately convex and concave. If desired, each alternate card (preferably those bent convexly) may also be cut out so as to expose a portion of the card (concavely bent) immediately behind it.

A further possible improvement, not shown in the drawing, consists in grouping a plurality of cards (say about 25) in a folder, which folder serves also as an index. Lifting the folder partway out of the file gives the upper portions of the cards ample space for spreading while the lower portions are still compressed by the cards adjacent. The result is a fanning out of the cards, greatly increasing the visibility of their upper portions.

Although I have in the foregoing limited my description of my invention to its applicability to a system of filing or record members consisting each of a single card or sheet, it is equally applicable to filing systems in which the unit consists of a folded sheet, as in the ordinary filing folder.

I claim:

1. In a card index file composed of cards and a container therefor, the improvement comprising a plurality of pairs of cards arranged in said container with the upper portions of the cards projecting therefrom and with one card of a pair being separated from, and disposed behind, the other card of said pair, each card of a pair being removable from the container independently of the other card, each card being warped about an axis thereof so as to present a convex side and a concave side, the cards of each pair having their concave sides disposed towards each other so that the central portions of the cards are spaced from each other while the edges parallel to the card axes approach each other, the said edges of each pair of cards being spaced from those of each adjacent pair, each card having along the upper edge thereof a cut-out portion and an index portion, the cards in each said pair being so arranged that the index portion of the rearward card is exposed to view through the cut-out portion of the forward card, said cards being adapted to be compressed to a flat shape in said container but to assume their warped state when the compression is relieved.

2. In a card index file the improvement comprising a plurality of pairs of cards adapted to be arranged one behind the other, one card of a pair being separate from the other card of said pair, each card of a pair being removable from the file independently of the other card, each card being warped about an axis thereof so as to present a convex side and a concave side, the cards of each pair having their concave sides disposed towards each other so that the central portions of the cards are spaced from each other, the upper edge portions of each pair of cards being spaced from those of each adjacent pair, each card having along the upper edge thereof a cutout portion and an index portion, the cards in each said pair being so arranged that the index portion of the rearward card is exposed to view through the cut-out portion of the forward card, said cards being adapted to be compressed to a flat shape but to assume their warped state when the compression is relieved.

LEWIS MAYERS.

References Cited in the file of this patent

UNITED STATES PATENTS

| Number | Name | Date |
|---|---|---|
| 464,877 | Judson | Dec. 8, 1891 |
| 1,311,207 | Best | July 29, 1919 |
| 1,835,678 | Strassel | Dec. 8, 1931 |
| 2,542,585 | Sillerud | Feb. 20, 1951 |

FOREIGN PATENTS

| Number | Country | Date |
|---|---|---|
| 38,817 | Switzerland | Nov. 23, 1906 |
| 607,649 | Great Britain | Sept. 2, 1948 |